G. H. FORSYTH.
DISK WHEEL.
APPLICATION FILED AUG. 6, 1920.

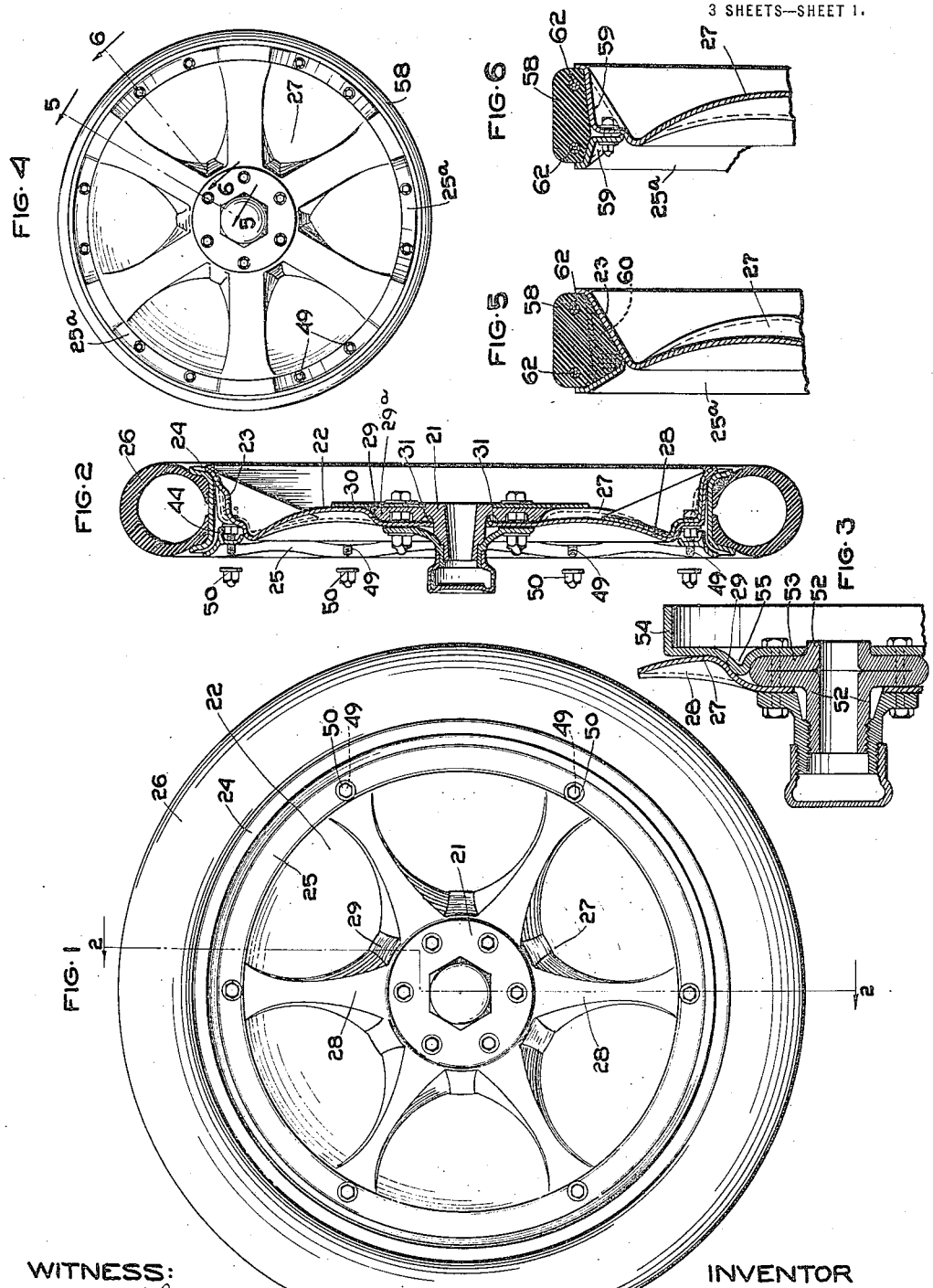

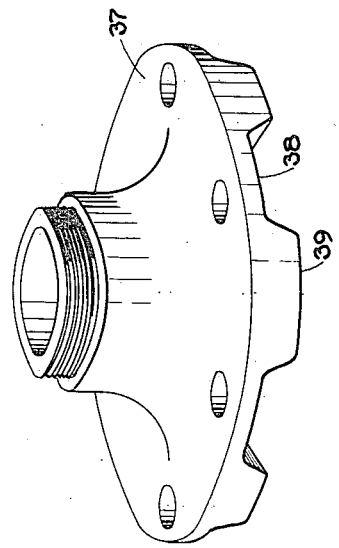
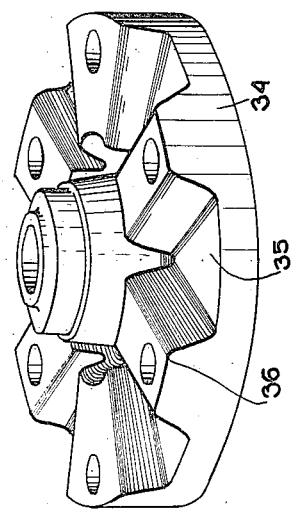
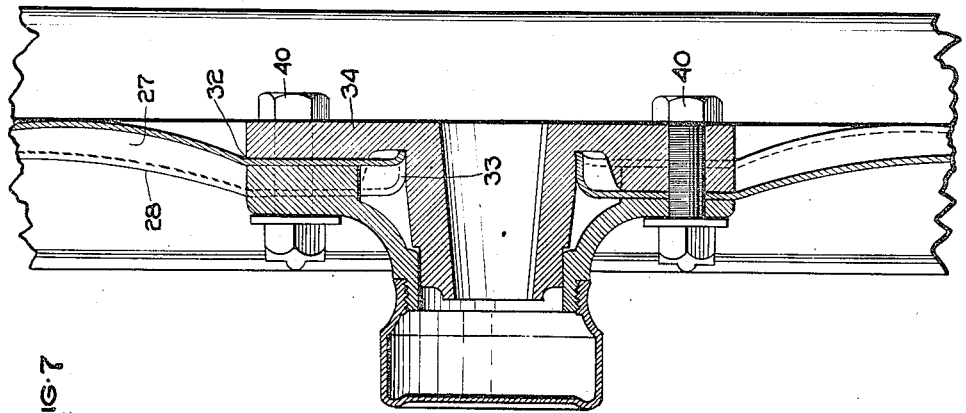

1,375,372.

Patented Apr. 19, 1921.
3 SHEETS—SHEET 3.

WITNESS:

INVENTOR
GEORGE H. FORSYTH
ATTORNEYS

UNITED STATES PATENT OFFICE.

GEORGE H. FORSYTH, OF HARVEY, ILLINOIS.

DISK WHEEL.

1,375,372. Specification of Letters Patent. Patented Apr. 19, 1921.

Application filed August 6, 1920. Serial No. 401,709.

*To all whom it may concern:*

Be it known that I, GEORGE H. FORSYTH, a citizen of the United States, residing at Harvey, in the county of Cook and State of Illinois, have invented certain new and useful Improvements in Disk Wheels, of which the following is a specification.

The present invention has for its principal object the provision of a disk steel wheel having symmetrical graceful lines and possessing in the highest degree qualities of strength under dead loads and resistance to radial and lateral shocks under exigencies of use; the direct transmission to an abutment on the hub of inwardly applied strains and shocks by means of radial ribs or spoke-like corrugations; the interlocking of the hub and disk to prevent angular displacement and to reinforce the connecting bolts or rivets against shearing; the assembly of the wheel and demountable rim with provision for interlocking with the driving lug and accommodation for the rim-latch; a rim or tire-retaining ring member of undulatory or wave-like conformation, clamped at the wave's crest to the wheel whereby to insure the maintenance of the ring against the rim under stress intermediate the clamping bolts; a novel hub characterized by its formation from a drawn tube medially upset by longitudinal compression to produce a hub flange; a tire seat wherein the tire material is peripherally interlocked with the felly or rim and held against expansion by endless wire strands embedded therein; also other objects which will become apparent as the invention is hereinafter developed.

In order that the invention may be more fully understood, I have in the accompanying drawings and in the following detailed description predicated thereon set forth by way of exemplification a preferred embodiment of the same. It will be understood, however, that the invention is susceptible of embodiment in other and varied constructional forms without departure from the essence thereof as defined by the appended claims, wherefore the drawings and description are to be taken in an illustrative and not in an unnecessarily limiting sense.

In the drawings,

Figure 1 is a front elevation of a disk wheel embodying the invention and having a pneumatic tire mounted thereon;

Fig. 2 is a vertical section upon the irregular line 2—2 of Fig. 1;

Fig. 3 is a fragmentary vertical section illustrating a hub formation embodying the invention;

Fig. 4 is a front elevation illustrating the invention as applied to the seating of a solid rubber tire;

Figure 10:
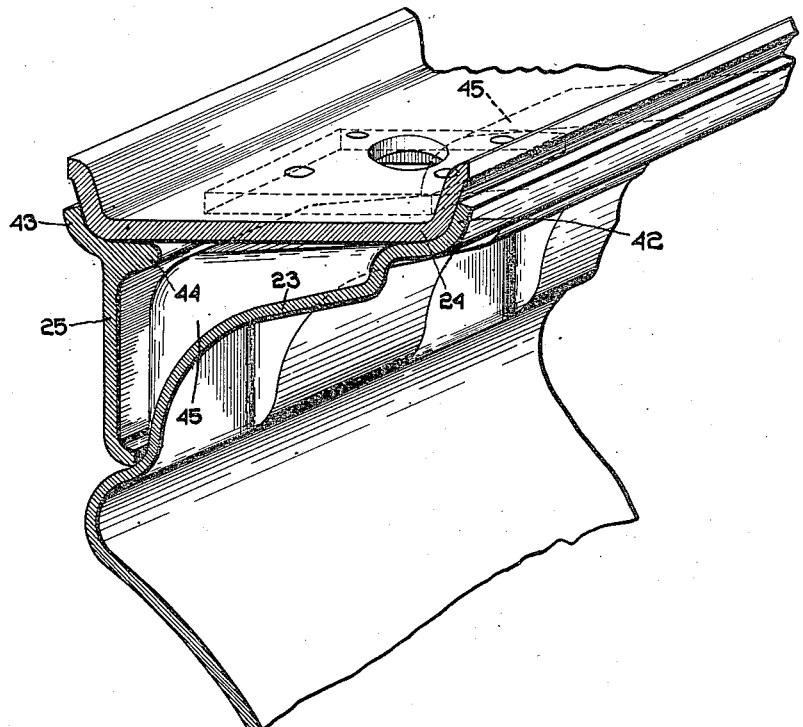
Figure 11:
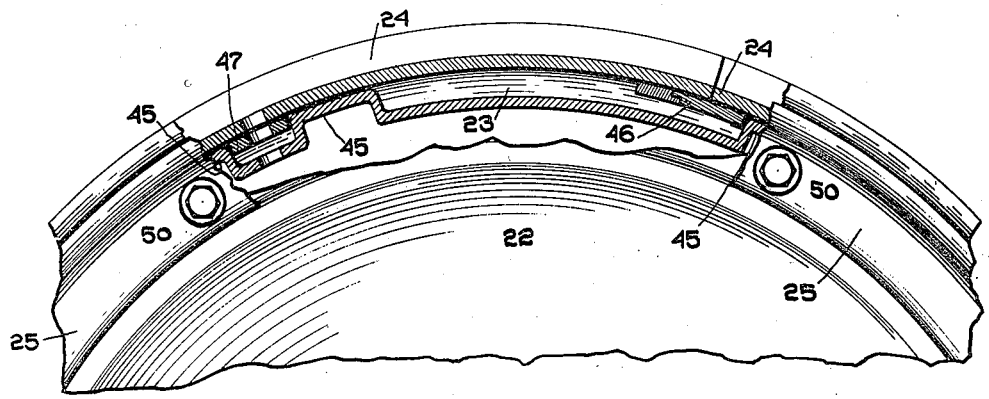

Figs. 5 and 6 are respectively radial sections taken on the lines 5—5 and 6—6 of Fig. 4;

Fig. 7 is an enlarged fragmentary section through the hub and central portion of the disk illustrating a modification of the invention;

Fig. 8 is a perspective view of the hub shown in Fig. 7;

Fig. 9 is a similar view of the hub plate shown in Fig. 7;

Fig. 10 is a perspective view illustrating the assembly of the felly, rim retaining ring and the demountable rim; and Fig. 11 is a fragmentary section through the periphery of the wheel illustrating the interlocking of the felly with the driving lug of the rim and also the housing of the rim-latch between the felly and rim.

Having particular reference to Figs. 1 and 2 of the drawings, the improved wheel is shown as comprising the hub 21, the medial disk portion 22, the felly portion 23, the rim 24, the rim retaining ring 25, and the pneumatic tire 26 mounted thereon.

It will be observed that the medial disk portion is depressed at spaced intervals 27 to provide therebetween radial elevations extending in the manner of spokes from the hub to and laterally beneath the felly, such elevations being designated by the reference numeral 28. Adjacent the felly the depressions 27 merge into the general plane of the disk, being of greatest depth near the hub and terminating with an abrupt inner wall 29 which bears inwardly against the hub, the hub flange, or a shouldered plate 30 forming a part of the hub.

As distinguished from ribs or radial corrugations which stiffen the disk against lateral stresses only, this construction transmits radial shocks directly to the hub in addition to strengthening the disk laterally, and also strengthens the felly against deformation.

About the central aperture of the disk, the metal is inwardly flanged as indicated at 31 to afford an additional abutment against the hub.

As most clearly shown in Figs. 7, 8 and 9, the spoke-like elevations extend inwardly beyond the point of clamping engagement to the hub at 32 and interiorly to the central aperture about the hub proper at 33 where the metal is inwardly flanged as previously mentioned. In this form of construction, the hub flange 34 is fluted to provide radial depressions 35 and elevations 36 while the hub plate 37 is similarly fluted to provide upon its inner face depressions 38 and elevations 39. The radial spoke-like corrugations of the central portion of the disk are received between the flutings of the hub flange and the hub plate and are clamped therebetween by means of the bolts 40, whereby an interlocking is secured of the disk wheel to the hub, effectually preventing angular displacement and reinforcing the bolts against shearing.

In Figs. 10 and 11 the assembly relation between the felly portion of the disk indicated at 23 and the demountable rim 24 by means of the rim retaining ring 25, is most clearly shown. It will be seen that the felly portion extends laterally at an inclination to the wheel axis and terminates marginally in a rim retaining bead 42 while the rim retaining ring 25 is also provided with a rim retaining bead 43, the rim being seated and supported between the beads 42 and 43 upon the inclined marginal portion of the felly 23 and upon a ledge 44 of the ring. At intervals, the felly is outwardly cupped as indicated at 45 to present an outer wall closely underlying the inner face of the rim when seated on the wheel. Intermediate these spaced cups a space is provided for the accommodation of the usual rim latch 46, while two of the cups, separated a distance corresponding substantially to that of the driving lug 47 serve to receive the lug therebetween and form interlocking abutments therefor.

The ledge 44 formed upon the rim-retaining ring 25 serves as a positive support for the rim, limiting the tendency which would otherwise be present for the rim underload to wedge downwardly and inwardly along the incline of the usual bead, thus removing the outwardly wedging strain upon the rim retaining ring and assuring an immovable seat for the inner edge of the rim.

An inspection of Fig. 2 of the drawing will show that the rim retaining ring 25 does not throughout its extent occupy a plane parallel to that of the median plane of the wheel. On the contrary, it is undulate in character and comprises a series of undulations or waves viewed peripherally. This ring, at the crest of each wave, is apertured to receive one of the clamping bolts 49, the result being that when the nuts 50 are applied to the bolts 49 and drawn home, the ring will be flattened into a plane and intermediate the bolts will be pressed against the demountable rim. This obviates the tendency found in the usual construction of the ring yielding away from the rim at points intermediate the clamping bolts.

Having reference now to Fig. 3 of the drawing, an improved form of hub is shown constructed from a piece of drawn tubing 52, the medial portion of which is expanded and upset as indicated at 53 by longitudinal compressions, the upset portion 53 presenting tube portions reversely bent and constituting an integral hub flange.

In this Fig. 3 a brake drum 54 is shown as shouldered at 55 to overlie the margin of the hub flange and to form, in effect, a portion thereof. This shoulder 55 serves as an inner abutment or seat for the depressed portion 29 of the medial disk 27. In Fig. 2, the equivalent construction is found in the shouldered portion 29 of the plate 30.

Referring to Figs. 4, 5 and 6 of the drawings, the wheel is shown as adapted to a solid rubber tire 58. Herein, the depressed portion 27 of the disk corresponds radially with a cupped portion 59 of the felly which cupped portions 59 enter corresponding recesses 60 upon the inner face of the tire 58, while intermediate these cups 59 the rubber of the tire extends down into the pockets between the cups and rests upon the inclined felly 23. At the opposite side, the tire retaining ring 25ª is cupped at corresponding intervals to seat within a corresponding recess of the inner face of the tire.

It will be observed, having reference to Figs. 4, 5 and 6, that as the tire retaining ring 25ª is drawn home by means of the bolts 49, the rubber tire 58 is compressed laterally and caused to wedge inwardly along the inclined walls of the ring and felly into the recesses, whereby interlocking of the tire with the wheel to prevent creeping around the wheel under tractive friction is accentuated.

In order to further strengthen the tire and prevent its stretching or expanding, I embed therein, preferably on both sides of the median line and adjacent the edges, endless wire strands 62. These may be of a single wire or a cable formed by twisting a number of wires, the individual wires being connected at non-corresponding points, or a plurality of wires wound around a core so as to present in effect an endless construction. These endless strands are embedded in the tire in the process of molding, thus presenting no weak points at which the strands would tend to part.

I claim:

1. In a wheel, the combination of hub plates, a disk forwardly concave and having its central portion disposed between the plates, and clamping bolts securing the plates upon the disk, the disk provided adjacent the hub plates with radially elongated pockets.

2. In a wheel, the combination of hub plates, a disk forwardly concave and having its central portion disposed between the plates, and clamping bolts securing the plates upon the disk, the disk provided adjacent the periphery of the hub plates with spaced radially elongated pockets merging toward the wheel periphery into the general plane of the disk.

3. In a wheel, the combination of hub plates, a disk having its central portion disposed between the plates, and clamping bolts securing the plates upon the disk, the disk provided with spaced radially elongated pockets having abrupt inner end walls disposed adjacent the periphery of the plates and merging outwardly into the general plane of the disk to reinforce the disk progressively inward against bending stresses.

4. In a disk steel wheel, the combination with the central hub, and the peripheral felly portion, of a medial disk portion having formed therein as viewed from the front spaced depressions forming therebetween radial spoke-like elevations extending from the hub, the depressions having an inner wall bearing upon the hub.

5. In a disk steel wheel, the combination with the central hub, and the peripheral felly portion, of a medial disk portion having formed therein as viewed from the front spaced depressions forming therebetween radial spoke-like elevations extending from the hub to the felly, the depressions having an inner wall bearing upon a portion of the hub.

6. In a disk steel wheel, the combination with the central hub, and the peripheral felly portion, of a medial disk portion having formed therein as viewed from the front spaced depressions forming therebetween radial spoke-like elevations extending from the hub to and laterally beneath the felly, the depressions having an abrupt inner wall bearing upon a portion of the hub.

7. In a single disk wheel, the combination with the central hub, and the peripheral felly portion, of a medial disk portion having formed therein as viewed from the front spaced depressions forming therebetween radial spoke-like elevation extending from the hub to and laterally beneath the felly, the depressions having an abrupt inner wall bearing upon a portion of the hub.

8. In a disk steel wheel, the combination with the central hub, and the peripheral felly portion, of a medial disk portion having formed therein as viewed from the front spaced depressions forming therebetween radial spoke-like elevations extending from the hub, the depressions having an inner wall bearing upon the hub, the hub having an inner flange fluted on its front face to interfit with the elevations and depressions of the disk, and a hub plate similarly fluted on its rear face to interfit the elevations and depressions of the disk, the disk clamped between the hub flange and plate, whereby to interlock the hub and disk against angular displacement.

9. In a disk steel wheel, the combination with the central hub, and the peripheral felly portion, of a medial disk portion having formed therein as viewed from the front spaced depressions forming therebetween radial spoke-like elevations extending from the hub to and laterally beneath the felly, the depressions having an abrupt inner wall bearing upon a portion of the hub, the hub having an inner flange fluted on its front face to interfit with the elevations and depressions of the disk, and a hub plate similarly fluted on its rear face to interfit the elevations and depressions of the disk, the disk clamped between the hub flange and plate, whereby to interlock the hub and disk against angular displacement.

10. In a wheel, the combination with the felly portion adapted to receive and support a demountable rim, of a rim-retaining ring for coöperation therewith, the ring undulate in form to cause the same when unstressed to contact with the rim at spaced intervals only, and clamping means acting on the ring at points corresponding to the crest of the undulations whereby when the crests are flattened the intermediate portion of the ring will be stressed against the rim.

11. In a wheel, the combination with the felly portion adapted to receive and support a demountable rim, of a rim-retaining ring for coöperation therewith, the ring undulate in form to cause the same when unstressed to contact with the rim at spaced intervals only, and bolt-receiving holes in the ring corresponding to the crest of the undulations whereby when the bolts are drawn up the intermediate portion of the ring will be stressed against the rim.

12. In a disk steel wheel, the combination with the felly portion adapted to receive and support a demountable rim, of a rim-retaining ring for coöperation therewith and comprising an inner bolt-receiving web, a marginal-rim-retaining bead, and a rearwardly extending ledge underlying and supporting the rim, the ring undulate in form to cause the same when unstressed to contact with the rim at spaced intervals, the bolt-receiving holes in the ring corresponding to the crest of the undulations whereby when the bolts are drawn up the intermediate portions of the ring will be stressed against the rim.

13. In a wheel, the combination of a hub, a disk body portion having a peripheral overhanging felly portion adapted to receive a demountable rim, the medial portion of the disk progressively reinforced inwardly toward the hub, and yielding means acting upon the rim and disk to force the rim upon the felly and circumferentially compress the disk, said means including an undulate ring and clamping means acting on the ring at the crests of the undulations.

14. In a wheel, the combination with a hub portion and a peripheral portion, the latter offset at an inclination to form a rim-supporting felly, of a wheel body of spoke-like formation yieldable in the plane of the wheel, and means for assembling the rim with the felly to place the wheel body under radial compressive stress.

15. In a wheel, the combination with a hub portion and a peripheral portion, the latter offset at the inclination to form a rim-supporting felly, of a body portion of spoke-like formation, and means for assembling the rim with the felly to place the wheel body under radial compressive stress, said means including an undulate ring bearing against the rim and the wheel body, and bolts connecting the wheel with the ring at the crests of undulations.

In testimony whereof I have hereunto signed my name in the presence of two subscribing witnesses.

GEORGE H. FORSYTH.

Witnesses:
LEWIS T. GREIST,
FRANCES K. GILLESPIE.